(12) United States Patent
Zhuang et al.

(10) Patent No.: US 8,985,177 B2
(45) Date of Patent: Mar. 24, 2015

(54) POLARIZING SHEET REMOVING TOOL AND REMOVING METHOD

(71) Applicant: Shenzhen China Star Optoelectronics Technology Co., Ltd., Shenzhen, Guangdong Province (CN)

(72) Inventors: Yizhuang Zhuang, Shenzhen (CN); Jungmao Tsai, Shenzhen (CN); Shiueshih Liao, Shenzhen (CN); Songxian Wen, Shenzhen (CN); Mingfeng Deng, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 13/807,299

(22) PCT Filed: Dec. 4, 2012

(86) PCT No.: PCT/CN2012/085778
§ 371 (c)(1),
(2) Date: Dec. 27, 2012

(87) PCT Pub. No.: WO2014/082316
PCT Pub. Date: Jun. 5, 2014

(65) Prior Publication Data
US 2014/0144302 A1    May 29, 2014

(51) Int. Cl.
*B32B 38/10*    (2006.01)
*B26D 7/08*    (2006.01)
*B26B 27/00*    (2006.01)
(Continued)

(52) U.S. Cl.
CPC . *B26D 7/08* (2013.01); *B26B 27/00* (2013.01); *B26D 3/28* (2013.01); *G02F 1/133528* (2013.01); *G02F 2202/28* (2013.01); *Y10S 156/934* (2013.01); *Y10S 156/937* (2013.01)
USPC ........... 156/761; 156/703; 156/707; 156/714; 156/717; 156/718; 156/762; 156/763; 156/934; 156/937

(58) Field of Classification Search
USPC ......................... 156/703, 717, 762, 924, 937
See application file for complete search history.

(56) References Cited

U.S. PATENT DOCUMENTS 2,297,663 A * 9/1942 Strassman ...................... 264/163
2,484,619 A * 10/1949 George .......................... 156/761

(Continued)

FOREIGN PATENT DOCUMENTS

CN          2652529 Y      11/2004
JP         2009-78902 A     4/2009

*Primary Examiner* — Philip Tucker
*Assistant Examiner* — Nickolas Harm
(74) *Attorney, Agent, or Firm* — Cheng-Ju Chiang

(57) ABSTRACT

The present invention provides a polarizing sheet removing tool and removing method. The tool includes a handle and a blade mounted on the handle. The handle includes a main body, a piston device mounted on the main body, and a guide tube mounted on the main body. The main body forms therein a channel for containing an adhesive dissolving liquid. The piston device is mounted inside the channel. The guide tube has an end in communication with the channel and an opposite end positioned on the blade to guide the adhesive dissolving liquid contained in the channel to the blade. The present invention uses a tool on which a piston device and adhesive dissolving liquid are provided so that in removing a polarizing sheet, the adhesive dissolving liquid can be guided by a guide tube toward a blade for subsequently flowing toward and dissolving bonding adhesive.

5 Claims, 4 Drawing Sheets

(51) Int. Cl.
  *B26D 3/28* (2006.01)
  *G02F 1/1335* (2006.01)

(56) References Cited

U.S. PATENT DOCUMENTS

| | | | |
|---|---|---|---|
| 3,330,602 A * | 7/1967 | Riley et al. | 37/466 |
| 4,274,676 A * | 6/1981 | Chapel | 299/64 |
| 4,466,851 A * | 8/1984 | Hoffman | 156/761 |
| 4,584,044 A * | 4/1986 | Tokunaga et al. | 156/752 |
| 4,618,395 A * | 10/1986 | Breucha | 156/750 |
| 7,121,007 B2 * | 10/2006 | Ogston | 30/169 |
| 7,150,804 B2 * | 12/2006 | Tajima | 156/718 |
| 2002/0088556 A1 * | 7/2002 | De et al. | 156/584 |
| 2011/0023668 A1 * | 2/2011 | McMahon et al. | 83/13 |

* cited by examiner

POLARIZING SHEET REMOVING TOOL AND REMOVING METHOD

BACKGROUND OF THE INVENTION

1. Field of the Invention

The present invention relates to the field of manufacturing liquid crystal display panels, and in particular to a polarizing sheet removing tool and removing method.

2. The Related Arts

Liquid crystal displays (LCDs) have numerous advantages, such as thin device body, less power consumption, and being free of radiation, and is thus widely used. Most of the flat panel display devices available in the market are backlighting liquid crystal displays, which comprise a liquid crystal display panel and a backlight module. The operation principle of the liquid crystal display panel is that liquid crystal molecules are arranged between two parallel glass substrates and electricity is selectively applied to circuits of the glass substrates to control change of the orientation of the liquid crystal molecules in order to refract out the light from a backlight module for formation of an image.

Referring to FIG. 1, a liquid crystal display panel is generally composed of a thin-film transistor (TFT) substrate 100, a color filter (CF) substrate 300 that is laminated on the TFT substrate 100, and liquid crystal 500 interposed between the TFT substrate 100 and the CF substrate 300. Both the TFT substrate 100 and the CF substrate 300 comprise a polarizing sheet 700 laminated thereon. The polarizing sheet 700 is an optic film that is formed by combining multiple layers of polymer materials to have a function of polarizing light and is laminated on the surface of the TFT substrate 100 that is distant from the CF substrate 300 and the surface of the CF substrate 300 that is distant from the TFT substrate 100 to convert non-polarized natural light into polarized light, allowing light that is in a direction perpendicular to the electric field to pass. This makes the liquid crystal display panel normally displaying an image. Apparently, the polarizing sheet is one of the key components that affect the displaying performance of a liquid crystal display panel.

The polarizing sheet is bonded to the liquid crystal display panel by adhesives, so that an adhesion force is present between the polarizing sheet and the liquid crystal display panel. Although the industry does not set up technical specifications for the adhesion force, yet for example, the adhesion force may not be excessively small in order to prevent the polarizing sheet from self-peeling or warping and the adhesion force may also not be excessively large otherwise subsequent maintenance operations may be affected. However, it is inevitable that the adhesion force interferes with the removal of the adhesion force to some extents.

Based on analyses conventionally made on defect products found in manufacturing processes, in order to remove a portion of the polarizing sheet from a liquid crystal display panel when a problem associated with the polarizing sheet occurs, the conventional way is using a cutter to cut the polarizing sheet to be peeled off into a square area (of which the size is determined according to practical needs) and then using the cutter to separate the polarizing sheet from the glass in order to peel off the polarizing sheet. However, it is often that the adhesion force is relatively strong and it is hard to completely peel off the polarizing sheet. Generally, a major portion of adhesive is left on the glass. This portion of adhesive is difficult to remove and removal is usually done by applying the cutter multiple times. This severely affects the speed and result of peeling of polarizing sheet and lowers down the efficiency of experimental analyses.

SUMMARY OF THE INVENTION

An object of the present invention is to provide a polarizing sheet removing tool, which has a simple structure, is easy to operate, can effectively save the time used to remove the polarizing sheet, and is of high efficiency.

Another object of the present invention is to provide a polarizing sheet removing method, which effectively shorten removing time of polarizing sheet, increase efficiency of peeling off polarizing sheet, and improve the result of peeling.

To achieve the object, the present invention provides a polarizing sheet removing tool, which comprises a handle and a blade mounted on the handle. The handle comprises a main body, a piston device mounted on the main body, and a guide tube mounted on the main body. The main body forms therein a channel for containing an adhesive dissolving liquid. The piston device is mounted inside the channel. The guide tube has an end in communication with the channel and an opposite end positioned on the blade to guide the adhesive dissolving liquid contained in the channel to the blade.

The blade is mounted by a bolt to the handle, whereby included angle between the blade and the handle is adjustable.

The channel is formed by recessing a free end of the main body.

The piston device comprises a piston and a piston rod connected to the piston. The piston has an outside diameter that is greater than or equal to an inside diameter of the channel.

The main body forms, in an outside surface thereof, a hole that corresponds to the guide tube and the hole communicates with the channel, whereby the guide tube is in communication via the hole with the channel.

The present invention also provides a polarizing sheet removing tool, which comprises a handle and a blade mounted on the handle, the handle comprising a main body, a piston device mounted on the main body, and a guide tube mounted on the main body, the main body forming therein a channel for containing an adhesive dissolving liquid, the piston device being mounted inside the channel, the guide tube having an end in communication with the channel and an opposite end positioned on the blade to guide the adhesive dissolving liquid contained in the channel to the blade;

wherein the blade is mounted by a bolt to the handle, whereby included angle between the blade and the handle is adjustable;

wherein the channel is formed by recessing a free end of the main body;

wherein the piston device comprises a piston and a piston rod connected to the piston, the piston having an outside diameter that is greater than or equal to an inside diameter of the channel; and wherein the main body forms, in an outside surface thereof, a hole that corresponds to the guide tube and the hole communicates with the channel, whereby the guide tube is in communication via the hole with the channel.

The present invention further provides a polarizing sheet removing method, which comprises the following steps:

(1) providing an operation table and a tool, wherein the tool comprises a handle and a blade mounted on the handle, the handle comprising a main body, a piston device mounted on the main body, and a guide tube mounted on the main body, the main body forming therein a channel for containing an adhesive dissolving liquid, the piston device being mounted inside the channel, the guide tube having an end in communication with the channel and an opposite end positioned on the blade to guide the adhesive dissolving liquid contained in the channel to the blade;

(2) positioning the liquid crystal display panel from which a polarizing sheet is to be removed on the operation table, wherein the liquid crystal display panel comprises a substrate, a polarizing sheet laminated on a surface of the substrate, and bonding adhesive interposed between the polarizing sheet and the substrate, the polarizing sheet being set to be distant from the operation table;

(3) using the blade to cut a square area on the polarizing sheet to be removed;

(4) partially peeling off the polarizing sheet located in the square area from one side of the square area to lift up a portion of the polarizing sheet that corresponds to the side;

(5) positioning the blade against the bonding adhesive between the polarizing sheet and the substrate and driving the piston device to compress the adhesive dissolving liquid contained the channel so that the adhesive dissolving liquid flows through the guide tube to the blade to subsequently flow to the bonding adhesive to dissolve the bonding adhesive, and at the same time, pushing the blade forward to cut off the bonding adhesive; and (6) repeating step (5) until the polarizing sheet within the square area is completely removed.

The blade is mounted by a bolt to the handle, whereby included angle between the blade and the handle is adjustable.

The channel is formed by recessing a free end of the main body.

The piston device comprises a piston and a piston rod connected to the piston, the piston having an outside diameter that is greater than or equal to an inside diameter of the channel.

The main body forms, in an outside surface thereof, a hole that corresponds to the guide tube and the hole communicates with the channel, whereby the guide tube is in communication via the hole with the channel.

The efficacy of the present invention is that the present invention provides a polarizing sheet removing tool and removing method, which uses a tool on which a piston device and adhesive dissolving liquid are provided so that in an operation of removing a polarizing sheet, the adhesive dissolving liquid contained in the handle is guided by a guide tube toward a blade for subsequently flowing toward the bonding adhesive to dissolve the bonding adhesive, thereby making the polarizing sheet easily removable, shortening removing time of the polarizing sheet, and improving removing efficiency and removing performance.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
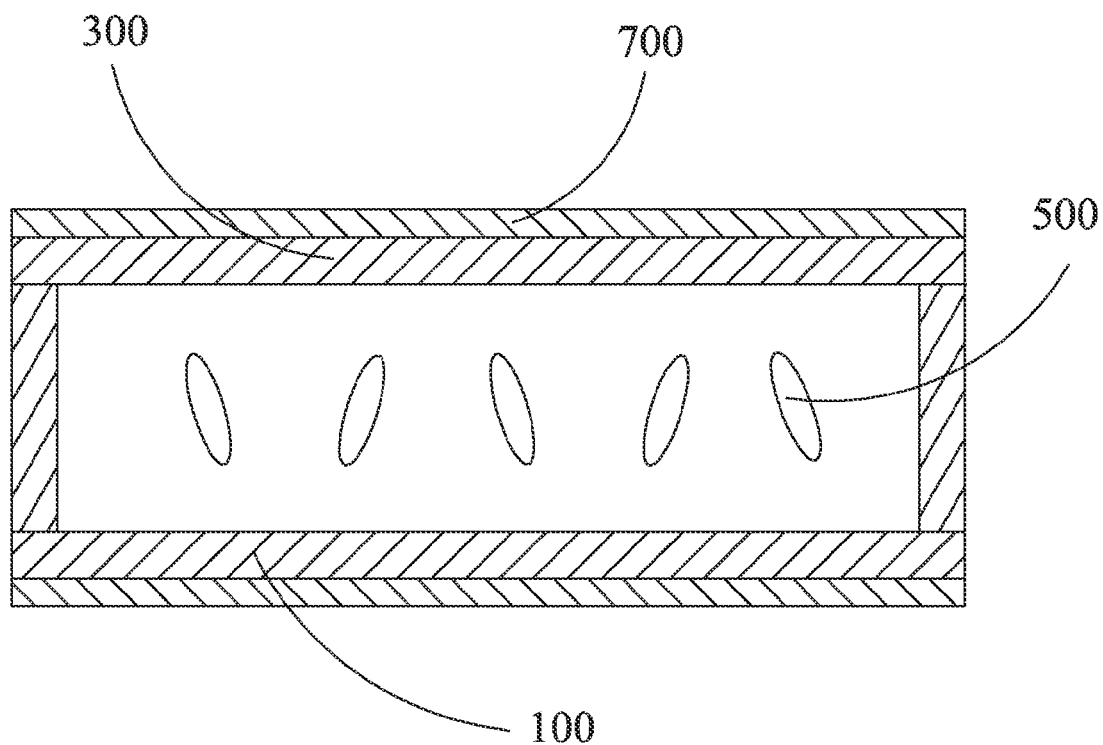
FIG. 1 is a schematic view showing the structure of a conventional liquid crystal display panel.
Figure 2:
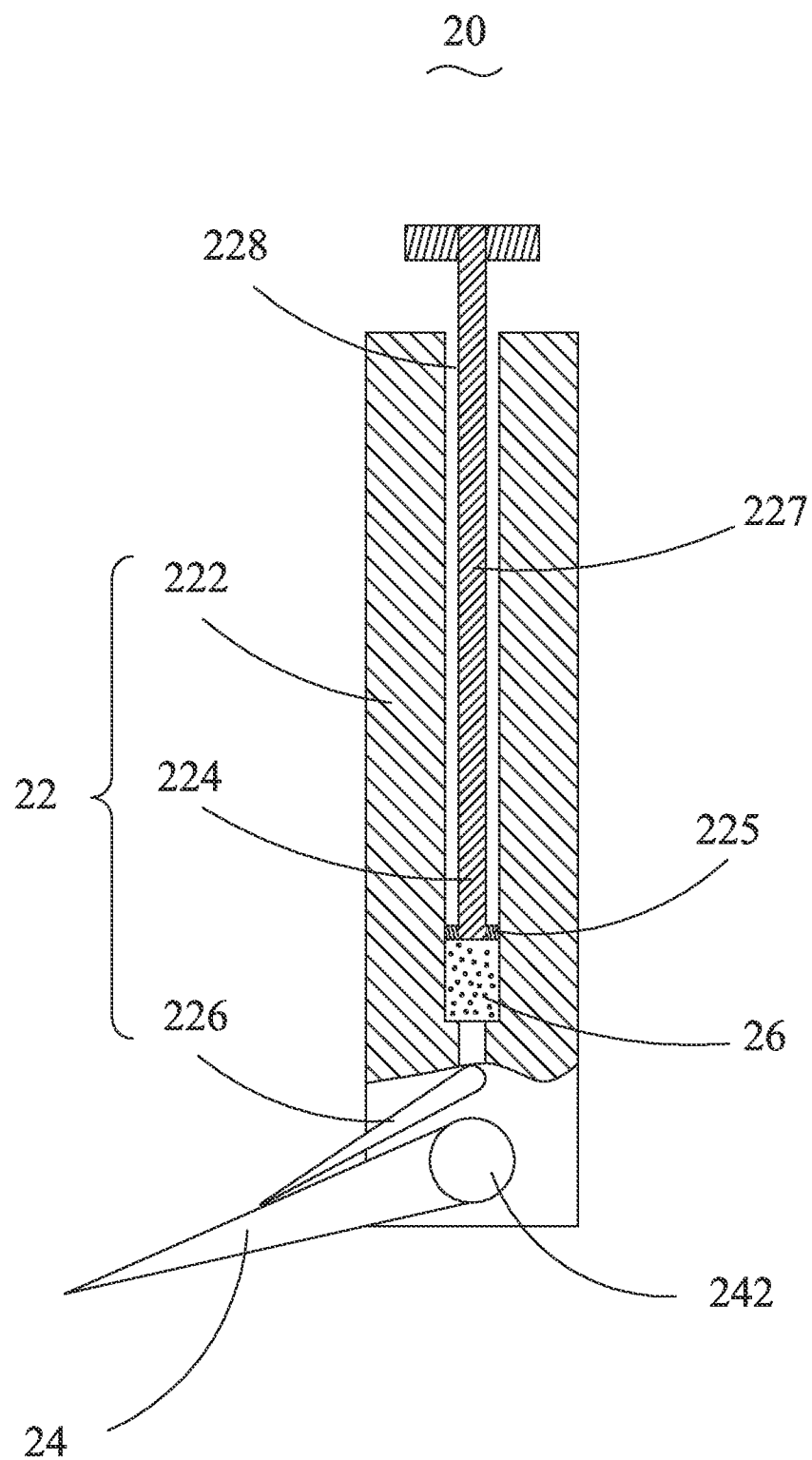
FIG. 2 is a schematic view showing the structure of a polarizing sheet removing tool according to the present invention.
Figure 3:
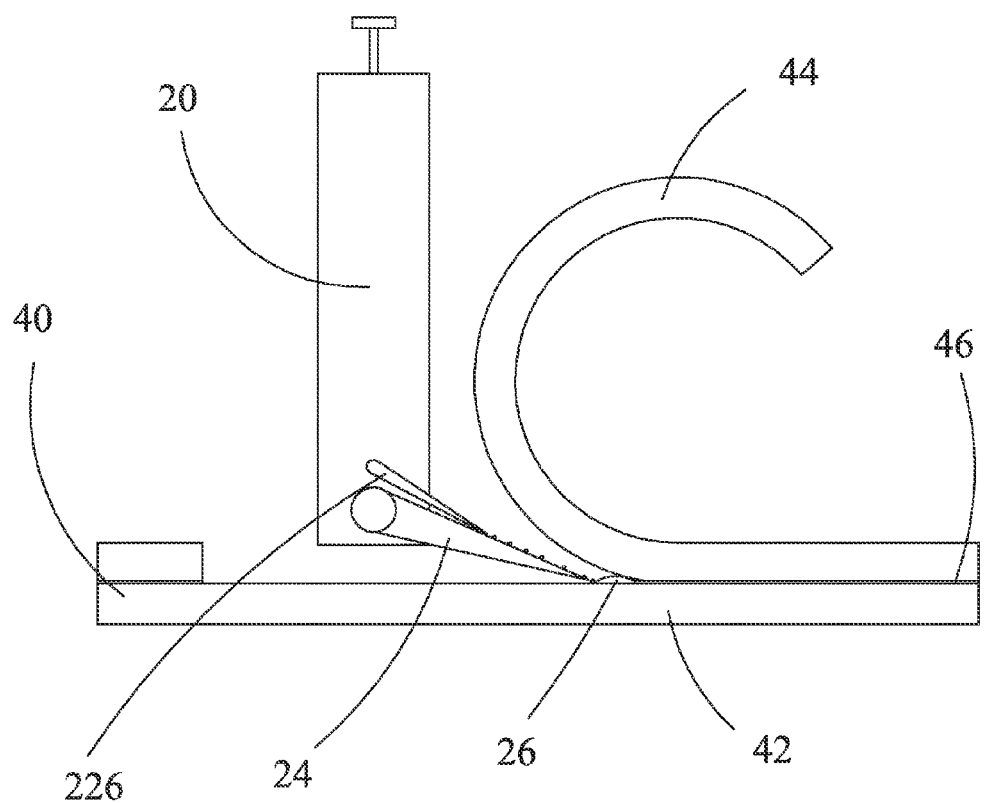
FIG. 3 is a schematic view illustrating removal of a polarizing sheet with the polarizing sheet removing tool according to the present invention.

Referring to FIGS. 2 and 3, the present invention provides a polarizing sheet removing tool 20, which comprises a handle 22 and a blade 24 mounted on the handle 22. The handle 22 comprises a main body 222, a piston device 224 mounted on the main body 222, and a guide tube 226 mounted on the main body 222. The main body 222 forms therein a channel 228 for containing an adhesive dissolving liquid 26. The piston device 224 is mounted inside the channel 228. The guide tube 226 has an end in communication with the channel 228 and an opposite end positioned on the blade 24 to guide the adhesive dissolving liquid 26 contained in the channel 228 to the blade 24. The adhesive dissolving liquid 26 flows over the blade 24 to reach bonding adhesive 46 between a substrate 42 and a polarizing sheet 44 of a liquid crystal display panel 40 in order to dissolve the bonding adhesive 46, making the polarizing sheet 44 easily removable, shortening removing time of the polarizing sheet, and improving removing efficiency and removing performance.

In the instant embodiment, the blade 24 is mounted by a bolt 242 to the handle 22, wherein included angle between the blade 24 and the handle 22 is adjustable to meet the needs for removing polarizing sheets of different thicknesses, different angles, and different directions. When it is necessary to adjust the included angle between the blade 24 and the handle 22, the bolt 242 is loosened, the blade 24 is set to a corresponding location, and the bolt 242 is re-tightened. The operation is easy.

The channel 228 is formed by recessing a free end of the main body 222. The piston device 224 is installed in the channel 228 via the free end.

The piston device 224 comprises a piston 225 and a piston rod 227 connected to the piston 225. The piston 225 has an outside diameter that is greater than or equal to an inside diameter of the channel 228. Preferably, the outside diameter of the piston 225 is equal to the inside diameter of the channel 228 to allow an outside surface of the piston 225 to be set in tight engagement with an inside surface of the channel 228 thereby tightly sealing the adhesive dissolving liquid 26 within the channel 228.

Further, the main body 222 forms, in an outside surface thereof, a hole (not shown) that corresponds to the guide tube 226 and the hole communicates with the channel 228, whereby the guide tube 226 is in communication via the hole with the channel 228. When the adhesive dissolving liquid 26 contained in the channel 228 is compressed by the piston 225, the adhesive dissolving liquid 26 flows through the guide tube 226 to the blade 24 to dissolve the bonding adhesive 46 in an operation of removing the polarizing sheet 44 with which the blade 24 is driven simultaneously to cut off the bonding adhesive 46. Simultaneous performances of dissolution and cutting are helpful to remove the bonding adhesive 46 in entirety and improve the removing efficiency and removing performance.

Figure 4:
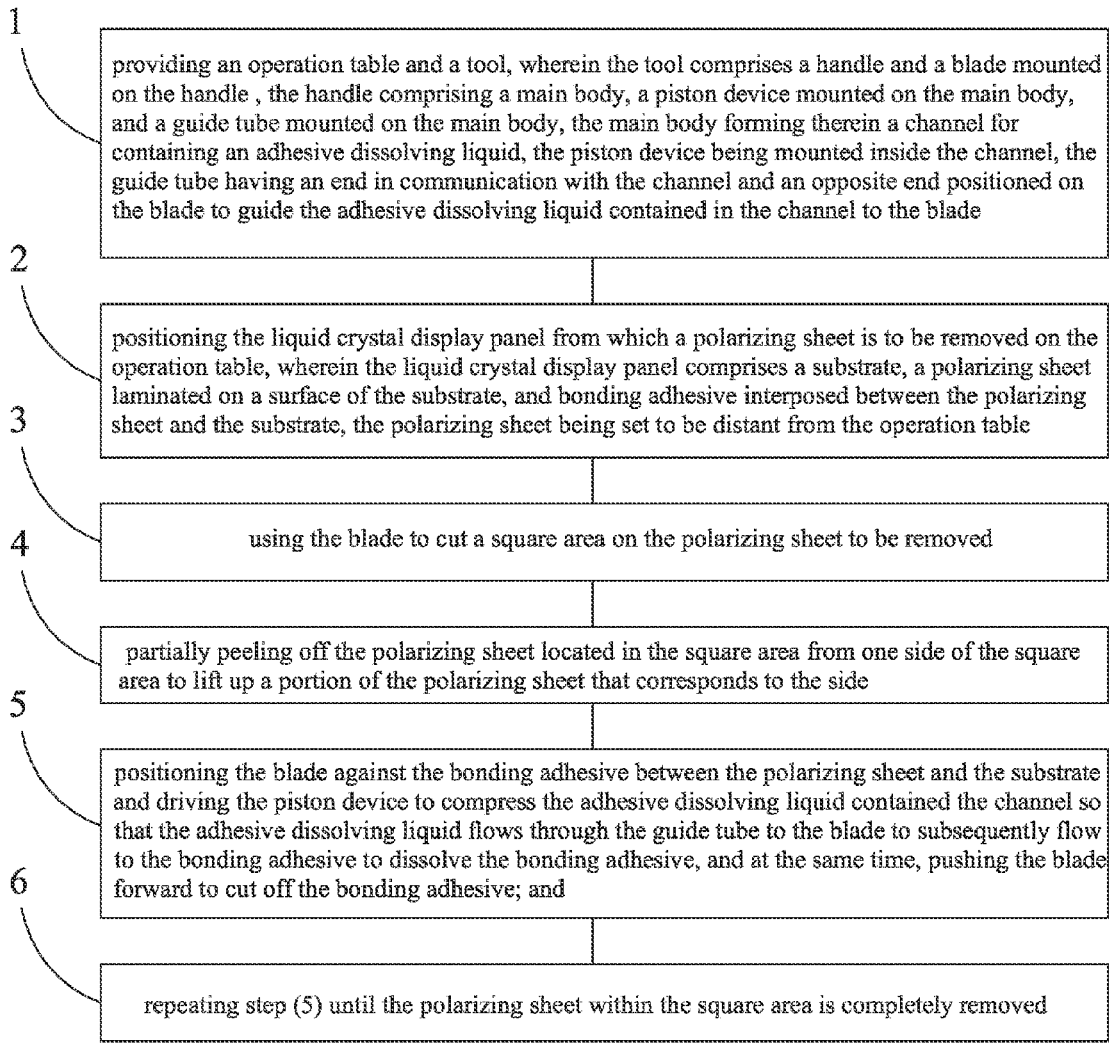
FIG. 4 is a flow chart illustrating a polarizing sheet removing method according to the present invention.

Referring to FIG. 4, together with FIGS. 2 and 3, the present invention also provides a polarizing sheet removing method, which comprises the following steps:

Step 1: providing an operation table (not shown) and a tool 20, wherein the tool 20 comprises a handle 22 and a blade 24 mounted on the handle 22. The handle 22 comprises a main body 222, a piston device 224 mounted on the main body 222, and a guide tube 226 mounted on the main body 222. The main body 222 forms therein a channel 228 for containing an adhesive dissolving liquid 26. The piston device 224 is mounted inside the channel 228. The guide tube 226 has an end in communication with the channel 228 and an opposite end positioned on the blade 24 to guide the adhesive dissolving liquid 26 contained in the channel 228 to the blade 24. The adhesive dissolving liquid 26 flows over the blade 24 to reach bonding adhesive 46 between a substrate 42 and a polarizing sheet 44 of a liquid crystal display panel 40 in order to dissolve the bonding adhesive 46, making the polarizing sheet 44 easily removable, shortening removing time of the polarizing sheet, and improving removing efficiency and removing performance.

In the instant embodiment, the blade 24 is mounted by a bolt 242 to the handle 22, whereby included angle between the blade 24 and the handle 22 is adjustable to meet the needs for removing polarizing sheets of different thicknesses, different angles, and different directions. When it is necessary to adjust the included angle between the blade 24 and the handle 22, the bolt 242 is loosened, the blade 24 is set to a corresponding location, and the bolt 242 is re-tightened. The operation is easy.

The channel 228 is formed by recessing a free end of the main body 222. The piston device 224 is installed in the channel 228 via the free end.

The piston device 224 comprises a piston 225 and a piston rod 227 connected to the piston 225. The piston 225 has an outside diameter that is greater than or equal to an inside diameter of the channel 228. Preferably, the outside diameter of the piston 225 is equal to the inside diameter of the channel 228 to allow an outside surface of the piston 225 to be set in tight engagement with an inside surface of the channel 228 thereby tightly sealing the adhesive dissolving liquid 26 within the channel 228.

Further, the main body 222 forms, in an outside surface thereof, a hole (not shown) that corresponds to the guide tube 226 and the hole communicates with the channel 228, whereby the guide tube 226 is in communication via the hole with the channel 228. When the adhesive dissolving liquid 26 contained in the channel 228 is compressed by the piston 225, the adhesive dissolving liquid 26 flows through the guide tube 226 to the blade 24 to dissolve the bonding adhesive 46 in an operation of removing the polarizing sheet 44.

Step 2: positioning the liquid crystal display panel 40 from which a polarizing sheet is to be removed on the operation table, wherein the liquid crystal display panel 40 comprises a substrate 42, a polarizing sheet 44 laminated on a surface of the substrate 42, and bonding adhesive 46 interposed between the polarizing sheet 44 and the substrate 42, the polarizing sheet 44 being set to be distant from the operation table.

Step 3: using the blade 24 to cut a square area on the polarizing sheet 44 to be removed.

Step 4: partially peeling off the polarizing sheet 44 located in the square area from one side of the square area to lift up a portion of the polarizing sheet that corresponds to the side.

Step 5: positioning the blade 24 against the bonding adhesive 46 between the polarizing sheet 44 and the substrate 42 and driving the piston device 224 to compress the adhesive dissolving liquid 26 contained the channel 228 so that the adhesive dissolving liquid 26 flows through the guide tube 226 to the blade 24 to subsequently flow to the bonding adhesive 46 to dissolve the bonding adhesive 46, and at the same time, pushing the blade 24 forward to cut off the bonding adhesive 46.

Simultaneous performances of dissolution and cutting are helpful to remove the bonding adhesive 46 in entirety and improve the removing efficiency and removing performance.

Step 6: repeating Step 5 until the polarizing sheet 44 within the square area is completely removed.

The present invention provides a polarizing sheet removing tool and removing method, which uses a tool on which a piston device and adhesive dissolving liquid are provided so that in an operation of removing a polarizing sheet, the adhesive dissolving liquid contained in the handle is guided by a guide tube toward a blade for subsequently flowing toward the bonding adhesive to dissolve the bonding adhesive, thereby making the polarizing sheet easily removable, shortening removing time of the polarizing sheet, and improving removing efficiency and removing performance.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A polarizing sheet removing tool, comprising a handle and a blade mounted on the handle, the handle comprising a main body, a piston device mounted on the main body, and a guide tube mounted on the main body, the main body forming therein a channel for containing an adhesive dissolving liquid, the piston device being mounted inside the channel, the guide tube having an end in communication with the channel and an opposite end positioned on the blade to guide the adhesive dissolving liquid contained in the channel to the blade, wherein the piston device comprises a piston that is movably received in the channel and a piston rod connected to the piston and partly extending outside the main body and operable to force the piston to move in the channel to drive the adhesive dissolving liquid to flow through the guide tube to the blade.

2. The polarizing sheet removing tool as claimed in claim 1, wherein the blade is mounted by a bolt to the handle in such a way that the bolt is in a plane defined by a surface of the blade, whereby an included angle between the surface of the blade and the handle is adjustable.

3. The polarizing sheet removing tool as claimed in claim 1, wherein the channel is formed by recessing a free end of the main body.

4. The polarizing sheet removing tool as claimed in claim 1, wherein the piston has an outside diameter that is greater than or equal to an inside diameter of the channel.

5. The polarizing sheet removing tool as claimed in claim 1, wherein the main body forms, in an outside surface thereof, a hole that corresponds to the guide tube and the hole communicates with the channel, whereby the guide tube is in communication via the hole with the channel.

* * * * *